Aug. 25, 1936.   H. R. GREEN   2,052,091
SEDIMENTATION TANK
Filed Jan. 10, 1934   2 Sheets-Sheet 1
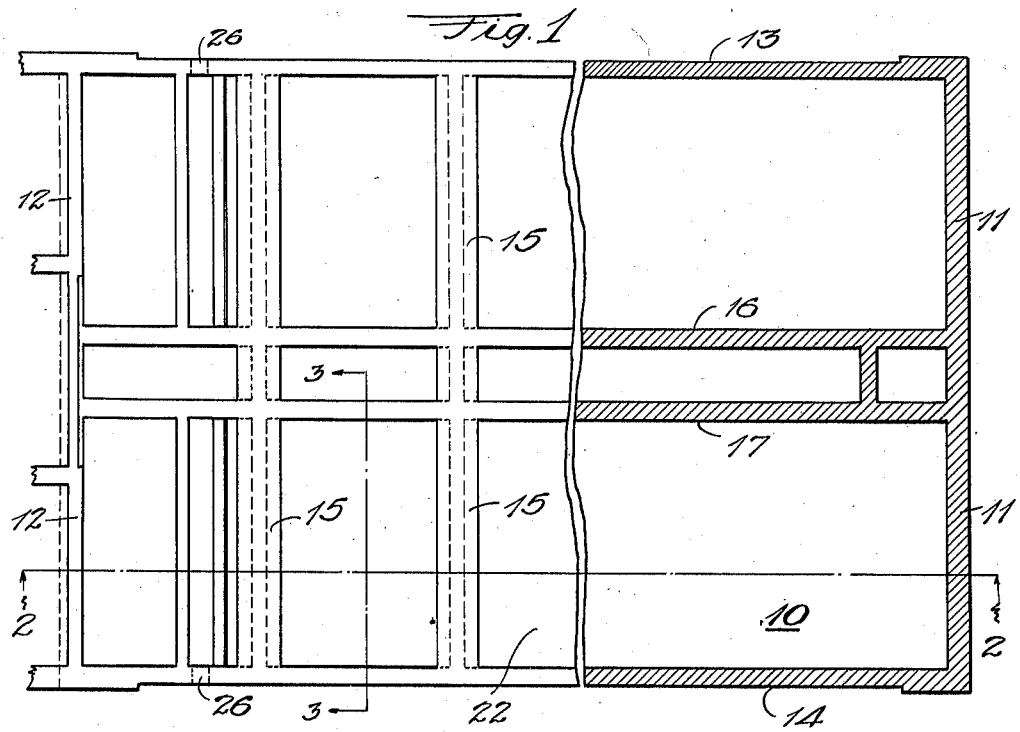
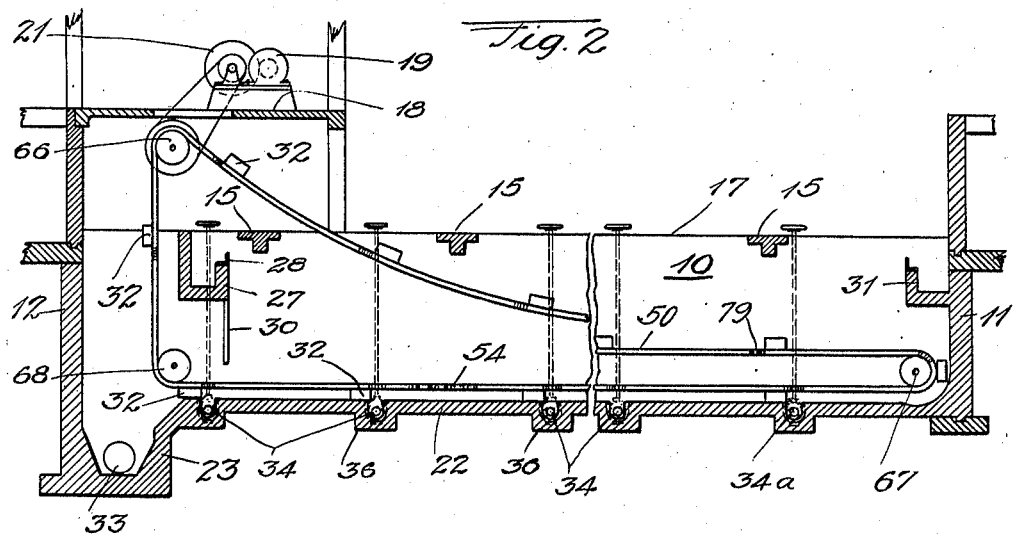
INVENTOR.
HOWARD R. GREEN
BY Flournoy Corey.
ATTORNEY.

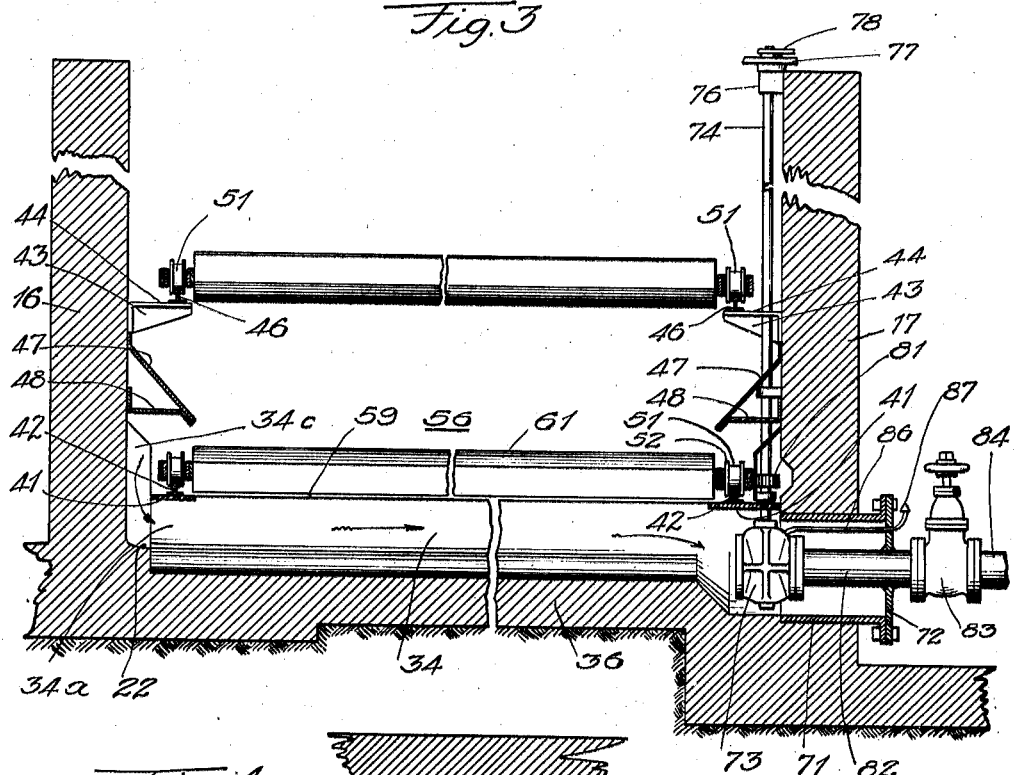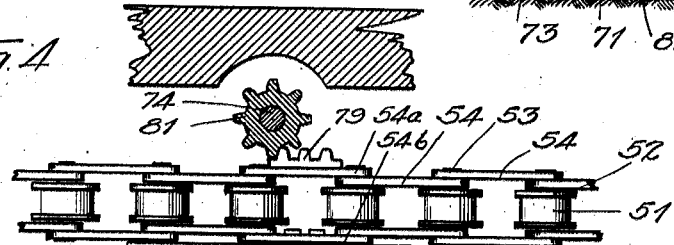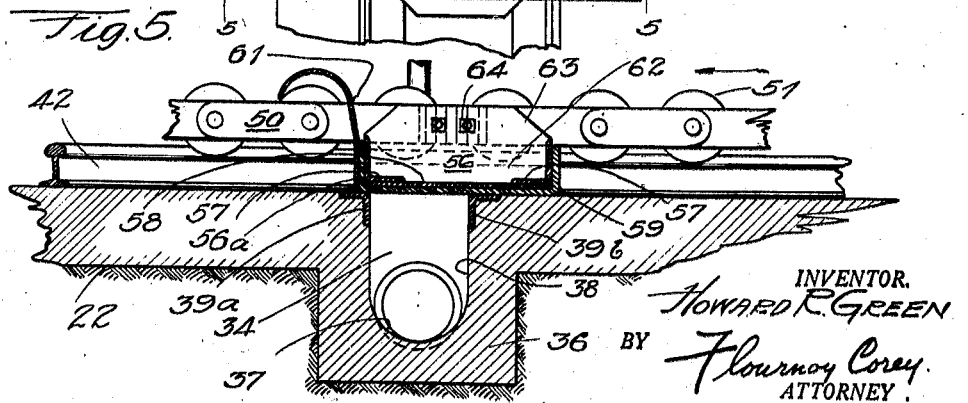

Patented Aug. 25, 1936

2,052,091

UNITED STATES PATENT OFFICE 2,052,091

SEDIMENTATION TANK

Howard R. Green, Cedar Rapids, Iowa

Application January 10, 1934, Serial No. 706,031

7 Claims. (Cl. 210—3)

This invention relates to improvements in sedimentation tanks, and particularly to means for assisting in the classification process and the withdrawal of classified material from the tank.

In sewage disposal plants, clarification is usually obtained in sedimentation tanks in which the sludge separates by gravity from the supernatant liquid and from which the sludge and the clarified liquid are withdrawn independently. Mechanical devices are employed for scraping the sludge from the surfaces upon which it is deposited and for moving it to a sump from which it is withdrawn, usually by means of a suction pump. It is the purpose of all such devices to provide for the removal of the sludge with the least possible amount of clarified liquid going out with it, and also to accomplish this removal with the least possible agitation of the supernatant liquid, but it has been impossible to prevent an undesired amount of clarified liquid to be discharged with the sludge and also an undesired amount of sludge to be discharged with the clarified liquid. This interferes, in the first instance, with the aftertreatment or digestion of the sludge, sometimes to such an extent that the matter withdrawn has to be resettled to free it from an excess of supernatant liquid and, in the second instance, it interferes with the efficiency of the sedimentation process and the after-treatment of the clarified effluent.

By use of my invention, the sludge is more quickly and completely removed from the tank and more thoroughly separated from the supernatant liquid, and these results are accomplished with a greatly reduced mechanical movement, thereby improving the efficiency of sedimentation and at the same time greatly reducing the quantity of power consumed. Moreover, my invention enables the separation to be effected more rapidly with simple and inexpensive installations which cover less space than former apparatus.

In the most common forms of plants, concrete settling tanks are provided into which the sewage is introduced, and in which the solid matter is permitted to settle to the bottom, and from which it is removed by means of scrapers carried by endless chains or by rigid arms which are rotated or otherwise moved over the bottom of the tank. Ordinarily these scrapers take the form of wooden scraper flights, blades or bars carried by two or more endless chains which pass around suitable sprockets and are driven by an electric motor or other source of power.

In the devices above described, the sludge and sediment must necessarily be carried the entire length of the tank to the discharge outlet. This procedure has several disadvantages. In order to minimize the disturbing effect of the mechanical motion of the scrapers, the speed is necessarily slow. A considerable period of time is consumed in the passage of one individual flight from one end of the settling tank to the other. The load of sludge carried by each scraper is therefore the maximum, and the tendency is to overload the capacity of each scraper. Light or flocculent materials or solids which tend to generate gases by decomposition are permitted to accumulate as deposits, for a considerable lapse of time between the instant of depositing upon the floor of the settling tank and their ultimate removal at the far end thereof. It must be borne in mind, in this connection, that the sludge may be of a very thin and watery mixture only slightly heavier than the supernatant liquid, and that a relatively slight disturbance may cause it to rise again or be disturbed. If an attempt is made to remove the sludge more rapidly by speeding up the scraping devices, a greater disturbance is created than before, and the tendency is to reduce the efficiency of the sedimentation unit.

Another disadvantage of the devices of the prior art is that many classes of sludge tend to become septic rapidly and, in the development of this septic action, gas bubbles are formed which cling to the particles of sludge and create a buoyant effect on the combined particle causing the bubble and its entrained solid to rise through the supernatant liquid, thereby interfering with the downward travel of settling particles, and tending to carry off an unwarranted portion of settleable solids with the clarified effluent.

It is, therefore, a general object of my invention to avoid the difficulties above enumerated and to generally improve the efficiency of the classification process which takes place in sedimentation tanks of the character described.

A more specific object of my invention is to provide means for taking off the sludge from sedimentation tanks at more frequent intervals than is the usual practice.

Another object of my invention is to remove sludge from the supernatant liquid without undue disturbance thereof.

Another object of my invention is to provide means for recapturing sludge-carrying gas bubbles to prohibit their rise through the supernatant liquid.

Another object of my invention is to provide shielding means so arranged as to cut off the sludge from the supernatant liquid.

Another object of my invention is to provide means for withdrawing sludge from the tank at intervals along the floor of the tank without materially disturbing the liquid in the tank.

Another object of my invention is to provide means for controlling the rate of flow of sludge as it is removed from the tank.

Another object of my invention is to provide means for completely clearing the bottom of the sedimentation tank of its accumulated sludge without requiring the movement of the scrapers more than a desired fraction of the length of the entire settling tank, thereby providing for a greatly increased rapidity of removal with greatly decreased mechanical movement of the parts of the scraping mechanism and the consequent minimum disturbance of the supernatant liquid by the submerged portion of the mechanism.

Another object of my invention is to provide for an efficient and satisfactory removal of sludge by intermittent operation of the mechanical device, thereby providing for greater periods of quiescence and for more ideal settling conditions, and also for greatly reducing the power consumed in the mechanical operation.

Another object of my invention is to insure a longer life of the moving parts of the scraping devices, and power units by reason of their operation through a much shorter period of time per day than heretofore required for the scraping operation.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 1 is a plan view of a pair of sedimentation tanks constructed according to one embodiment of my invention.

Figure 2 is a view in section of one of the tanks taken along the line 2—2 of Figure 1.

Figure 3 is a view in transverse section of one of the tanks, looking longitudinally of the tank, as indicated by the line 3—3 of Figure 1.

Figure 4 is a fragmentary plan view of the end of one of the scrapers constructed according to my invention, together with a portion of the chain for moving the scraper blades, a gear for actuating a valve, and a rack attached to the chain for rotating the gear, and Figure 5 is a view in section of the parts shown in Figure 4, taken along the line 5—5 of the figure.

Referring now to the drawings, there is shown at 10 generally, a tank preferably constructed of concrete or suitable material. This tank has end walls 11 and 12 and side walls 13 and 14 of the usual construction, and may be one of a battery of several tanks having some of the walls in common. Cross braces 15, extending across the tops of the tank, may be used. The tank shown is really in two parts and is divided by centrally located parallel walls 16 and 17, although this construction is not necessary, and my invention may be incorporated in almost any form of tank.

Referring to Figure 2, I preferably provide a raised platform 18 at one end of the tank, upon which a motor 19 and drive gearing 21, for driving the scraper belt, may be located. The floor 22 of the tank is substantially level, with the exception of a pit or sump 23 and its accompanying outlet 33 at one end thereof of usual construction which may be used for collecting and discharging sludge from the tank in connection with the usual installations, or which may be used as an auxiliary to the apparatus, constructed according to my invention, hereinafter more particularly described.

Sewage flows into the tanks through inlet conduits indicated at 26. The sewage enters a transverse channel indicated at 27 and flows out into the tank over a weir indicated at 28. In the present invention the transverse channel 27 is located inside the conveyor belt which carries the scrapers. A plate 30 preferably depends downwardly inside the tank below the inlet channel 27 to a position just above the lower portion of a chain belt conveyor, hereinafter more particularly described, and separates the main body of the liquid in the tank from the portion in which the conveyor belt travels upwardly, thus preventing disturbance of the main body of liquid by the upwardly traveling belt.

This location of the inlet channel, and of plate 30, is believed to be novel in the art, and is of major importance because the sewage being clarified does not ordinarily flow into the area through which the rising scrapers pass, and thereby any remaining solids carried by the scrapers are prevented from coming in contact with the settling sewage. It is common practice to arrange for a reversal of flow of the sewage entering at 31 and flowing out at 28 or vice versa as desired.

The supernatant liquid or clarified effluent is withdrawn from the tank over a second weir serving the outlet channel 31. This channel is hereinafter termed the "effluent channel". It may be seen by inspection of the drawings that the sewage enters at the left or influent channel 27 and flows slowly toward the right or effluent channel 31. The settleable solids slowly drop out by gravity to the bottom of the tank and are carried by the scrapers 32 in a direction toward the influent end of the tank. As soon as any of the scrapers reach a cross channel 34 the accumulated materials carried by the scraper drop into the channel and are withdrawn therefrom as hereinafter described.

The sedimentation tank so far described, with the exceptions above noted, is of the usual construction. In order to provide means for more efficient classification of the materials and for the withdrawal of the sludge without undue withdrawal of supernatant liquid, I prefer, among other expedients, to withdraw the sludge at certain intermediate points between the ends of the tank. In accomplishing this result, I preferably provide a plurality of cross channels 34 in the floor 22 of the tank. A sectional view of one of these cross channels is shown in Figure 5. The underside of the floor 22 of the tank is preferably provided with depending flange portions indicated at 36 and the channels 34 are formed in the floor and extend downwardly into the flanges 36. The channels are preferably formed with semi-cylindrical bottoms, as indicated at 37, and perpendicular sidewalls 38, the size and shape of the channels being so designed as to satisfy the conditions in each particular case. Of course any suitable shape or size of channel may be employed. The upper edges of the walls of the channel are of hard material or are preferably protected by means of angle irons 39 set in the concrete.

Referring now more particularly to Figures 3, 4 and 5, pairs of plates 41 are fastened to the bottom 22 of the tanks along either side thereof, and a pair of rails 42 are engaged to these plates. A plurality of brackets 43 are disposed on the sidewalls of the tanks, part way up the sides thereof, and these brackets are connected by means of plates 44, thus providing a pair of supports along the sides of the walls of the tank. Other rails 46 are secured to the plates 44 and the rails 42 and 46 constitute supports for the rollers of the chain belt conveyor. Other plates 47 are secured to the side walls of the tank, and these plates slope outwardly toward the center of the tank, so that sludge settling down through the sewage is directed toward the center of the tank, in order that it may be carried away by the scrapers. The plates 47 are braced by means of other plates 48.

The rollers 51, which roll on the rails 42 and 46, are flanged, as indicated at 52, in order that they will always ride on the rails. The rollers are rotatably mounted on shafts 53, and these shafts are connected by links 54, in accordance with the usual practice in constructing link belts of this character. The scrapers, indicated generally at 56, are preferably comprised of two transversely-extending angle-irons 57, connected at their lower faces by a flat plate 58. The sides of the angle irons and the bottom of the plate are preferably covered by means of a strip of material 59 such as rubber, composition material, or the like. An inverted channel member, or hood 61, is secured to the front end of the scraper 56, and extends upwardly and forwardly from the scraper. The hood 61 is preferably curved over and downwardly at its upper portion and is located in front of the scraper blade above that portion of the blade which first contacts the sludge on the bottom of the tank, as the scraper moves slowly along the bottom of the tank. Any gas bubbles or light sludge dislodged by the scraper and driven upwardly, or rising upwardly, is caught by this hood and is either deflected back down toward the bottom of the tank or remains at the upper portion of the hood, on the bottom side thereof, until it is withdrawn therefrom as hereinafter explained.

The scrapers 56 are provided with bracket angle irons 62, at either end thereof, and these angle irons connect the side angle irons 57 at either end thereof. The end angle irons 62 are provided with upwardly extending portions 63 which are adapted to be fastened to one of the innermost links 54 as by means of bolts 64. Of course the other end of the scrapers are supported from the other chain in the same manner. It is quite apparent that, as the driving motor 21 rotates, the drive gear 66, the chains 50, carrying the scrapers 56, move over the drive gear, and outwardly and downwardly into the tank, until they reach an idler gear 67 located near the outer or effluent end of the tank. There these scraper blades come into contact with the floor and start their return travel across the floor, scraping the sludge along before them. The sludge does not travel the full length of the tank, but need travel only to the next cross channel 34 where it is withdrawn by a means I am about to describe. The chain and scrapers, of course, after they have completed their journey across the bottom of the tank, move over another idler gear 68 and upwardly to the starting point at the drive gear 66. The scraper blades, during their travel between the idler gear 68 and drive gear 66, are in a horizontal position, with the hood 61 in a vertical position to permit the withdrawal of gas bubbles, and a scouring or cleaning action of the scraper blades by their upward travel through the liquid.

Referring now more particularly to Figure 3, I preferably provide a conduit 71, leading through the wall 17 of the sedimentation tank, at each of the cross channels 34. This conduit may be of pipe or any suitable material of any suitable shape, and is preferably closed off at its outer end, as by means of a plate 72. A valve housing 73 is preferably located at the inner end of this conduit in such position that the valve within the housing may be rotated by means of a vertically arranged shaft 74. This shaft preferably extends above the upper edge of the wall of the tank and is rotatably engaged thereto as by means of a bearing 76. An indicator disk 77 is secured to the bearing 76 and a pointer 78 on the projecting end of the shaft 74 sweeps over the disk 77 as the shaft is rotated. The disk 77 is provided with suitable indicia (not shown) for indicating the open and closed positions of the valve.

The valve, indicated generally at 73, is adapted to be intermittently rotated from closed to open position and back to closed position again, by means of a rack 79, which is fastened to the link 54a opposite to the link 54b to which one end of the scraper 56 is fastened. A gear 81, located on the shaft 74 in such a position that the gear rack 79 strikes and engages the teeth of the gear as the rack goes by, causes the gear 81 to be rotated through one-half of a revolution each time a rack portion goes by.

The valve 73 is connected with a pipe 82, which passes through the wall 72, and which is in turn connected with a second valve 83 on the outside of the tank. This valve 83 may be termed the "volume of flow" control valve, and it may be opened and closed as desired to regulate the volume of sludge drained off from the tank each time the inner mechanically-operated valve opens. The valve 83 may discharge into an open channel or pipe line as desired. A small tube 86 is preferably provided for conveying lubricant to the valve 73, or a hollow stem and hollow shaft 74 may be provided for lubrication from above. The tube 86 is, of course, connected with the interior of the valve 73, as indicated in the drawings, passes through the wall 72, and has a fitting 87 at its outer end so that lubricant may be supplied to the valve 73 without removing it from the tank, and the same principle would be applied if the hollow stem type is utilized. It is apparent that the valve 73 may be removed from the tank for inspection and repairs by removing the plate 72. It is obvious of course that the construction just described is duplicated at all of the cross channels 34.

In operation of the device, as the scrapers 56 scrape along the bottom of the tank, they collect material from the bottom thereof, as has been described. This material is carried along until it reaches one of the cross channels 34, where it falls into the cross channel. The scraper proceeds across the top of the channel 34 and after the leading edge has reached the other side of the channel, the rack 79 begins to engage the teeth of the gear 81 to open the valve 73. As the chain 50 proceeds, the valve 73 is opened to its fullest extent and is then closed. Closing of the valve preferably occurs before the trailing edge of the scraper leaves the near wall 39b. It is apparent, however, that if desired, the gear rack 79 may be so positioned as to cause opening of the valve 73, before the leading edge 56a of the scraper 56 reaches the wall 39a, so that any material which has gathered in front of the scraper and which may not have fallen into the channel 34 may be drawn into the channel.

During the period when the scraper 56 is over the channel 34, the rubber or composition flap 59 effectively closes the top of the channel. Liquid from within the tank thus is forced into the far end 34a of the channel 34 and drives the sludge in the channel 34 through the valve 73 where it is discharged to the sludge channel or pipe line 84. The valve 83 may be so regulated that a minimum of the supernatant liquid which enters the channel will be withdrawn. In this way, a sharp classification of sludge from the supernatant liquid may be secured. The scrapers extend the entire width of the tank, and the inlet 34c into the channel 34, is formed in the wall 16 or the liquid may enter the channel by flowing in under the angle iron 48 at the inlet or far end of the cross channel.

By use of any suitable time clock control known to the art, it is possible to stop the mechanism for any desired period of time, as soon as the discharging operation has been completed, thereby permitting the material in the tank to lie, in a quiescent condition, so far as mechanical movement is concerned, until the mechanism is again set in motion. It is obvious that this operating cycle can be varied at will until optimum conditions are determined. It is also obvious, by way of example, that if there be six cross channels, that the entire floor area of the tank will be swept free from sludge and the sludge discharged, when any one flight has traversed one-sixth of the length of the tank, and it likewise follows logically that the units described, when operating at the same speed as present units, will accomplish the same result with one-sixth of the mechanical motion, one-sixth of the wear on moving parts, and one-sixth of the power consumption. Similar ratios would hold good for any given number of cross channels.

It is apparent that the sludge may be removed at frequent intervals by means of a device constructed according to my invention. Regulation of the amount of sludge removed may be accurately controlled by the valves 83. For instance, the valve 83 controlling the flow of fluid from channel 34a may be open only to a small degree, inasmuch as the major part of the separation of the sludge may have occurred at the inner end of the tank. The other valves may be successively opened to a greater extent so that a greater volume of flow occurs at each successive valve or cross channel. The racks 79 may be so located on the chain 50 that any successive opening or sequential opening of valves 73 may be secured, or opening of all the valves at one time may be effected. The positions of the racks 79 on the links 54 may be so regulated, as has been explained, that opening of the valve 73 occurs before or after the channel has been closed by the scraper 56. If desired, the trailing edge of the scraper might be cut at an angle so that influx of the supernatant liquid into the channel back of the scraper blades, while the valve 73 was still open, might be secured and the flow of liquid thus regulated.

It is apparent that the principles of my invention are applicable regardless of the direction of flow of the sewage through the tank, and that the introduction of the inflow of sewage at the center line or other points in the tank, with the effluent channel at either or both ends, would not materially affect the operation of devices constructed according to my invention. It is apparent also that devices constructed according to my invention may be used or modified for use in a circular tank with radial flow and radial scrapers, or as another alternative, a square tank with radial scrapers.

It is also apparent that my invention might readily be applied to any sedimentation unit requiring the collection and removal of sludge, whether it be in sewage treatment plants, water purification plants, water softening plants, or in treating various industrial liquids for clarification and removal of sludge.

These and other modifications which may occur to those skilled in the art may be made without departing from the spirit and scope of my invention as set forth in the appended claims.

I claim as my invention:

1. In a sedimentation tank of the type in which scrapers pass over the bottom thereof to collect material from the bottom of the tank, means for improving the efficiency of the classification process comprising horizontally-extending flaps on the scrapers, the floor having channels therein adapted to be intermittently covered by the scraper flaps, valve means for withdrawing material from the channel, and means associated with the scraper blades for opening and closing the valves at predetermined times.

2. In a sedimentation tank, an endless belt, scrapers on the belt, valves for withdrawing liquid from the floor of the tank, and means on the endless belt for periodically opening and closing the valves.

3. In a sedimentation tank, an endless belt, scrapers on the belt, valves for withdrawing liquid from the floor of the tank, and means on the endless belt for periodically opening and closing the valves in consecutive order.

4. A sedimentation tank having a plurality of cross channels in the floor thereof, scraper blades adapted to scrape material into the cross channels, means on the scraper blades for closing the cross channels as the scraper blades pass along the floor, valves adapted to control the flow of fluid from the cross channels, and means associated with the scraper blades and channel closing means for opening and closing the valves during the time they are covered by the channel closing means.

5. In a sedimentation tank, a scraper blade for scraping material from the bottom of the tank, and means attached to the front of the blade for capturing gas bubbles which rise through the supernatant liquid in front of the scraper blade.

6. In a sedimentation tank, a scraper adapted to pass along the bottom of the tank, means for capturing gas bubbles rising from the bottom of the tank by reason of the passage of the scraper, and means for moving the capturing means to one end of the tank and discharging the gas bubbles at that point so that they will not disturb the main body of supernatant liquid.

7. A sedimentation tank having a plurality of cross channels in the floor thereof, tracks on the opposite side walls of the tank, endless chain belts adapted to ride on the tracks, scraper blades extending between the chain belts and adapted to scrape material from the floor of the tank into the cross channels, means on the scraper blades for closing the cross channels after the scraper blades have crossed over them, valve means for permitting the discharge of sludge and liquid from the cross channels, and means associated with one of the endless chain belts for opening and closing the valve means as the channel closing means passes over the channel.

HOWARD R. GREEN.